United States Patent
Kubota et al.

(10) Patent No.: US 10,242,607 B2
(45) Date of Patent: Mar. 26, 2019

(54) DISPLAY SYSTEM, DISPLAY APPARATUS, METHOD OF CONTROLLING DISPLAY APPARATUS, AND PROGRAM

(71) Applicant: SEIKO EPSON CORPORATION, Tokyo (JP)

(72) Inventors: Mitsuru Kubota, Matsumoto (JP); Takashi Natori, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/684,220

(22) Filed: Aug. 23, 2017

(65) Prior Publication Data

US 2018/0061288 A1 Mar. 1, 2018

(30) Foreign Application Priority Data

Aug. 31, 2016 (JP) ................................ 2016-169061

(51) Int. Cl.
*G06F 3/041* (2006.01)
*G09G 3/36* (2006.01)
(Continued)

(52) U.S. Cl.
CPC ........... *G09G 3/001* (2013.01); *G06F 3/1462* (2013.01); *G09G 5/00* (2013.01); *G09G 5/14* (2013.01); *H04N 7/0117* (2013.01); *H04N 9/3188* (2013.01); *G09G 2340/04* (2013.01); *G09G 2340/0407* (2013.01); *G09G 2340/0435* (2013.01); *G09G 2340/0464* (2013.01); *G09G 2350/00* (2013.01); *G09G 2360/12* (2013.01);
(Continued)

(58) Field of Classification Search
CPC .. G09G 3/001; G09G 5/00; G09G 2340/0407; G09G 2340/0435; G09G 2360/12; G09G 2360/18; H04N 7/0117; H04N 9/3188; H04N 7/01
See application file for complete search history.

(56) References Cited

U.S. PATENT DOCUMENTS 7,682,028 B2 * 3/2010 Maeda ................. H04N 5/74
345/530
2004/0130568 A1 7/2004 Nagano et al.
(Continued)

FOREIGN PATENT DOCUMENTS

JP 2004-54134 A 2/2004
JP 2013-122550 A 6/2013
(Continued)

*Primary Examiner* — Nelson M Rosario
(74) *Attorney, Agent, or Firm* — Oliff PLC

(57) ABSTRACT

A display system includes a display apparatus, a first terminal apparatus which transmits first image data, and a second terminal apparatus which transmits second image data. The display apparatus includes a communication unit that receives the first image data and the second image data, a display unit that displays a first image which is based on the first image data, and a second image which is based on the second image data, and a display control unit that changes at least one of an area for displaying the first image and an area for displaying the second image. The first terminal apparatus transmits the first image data to the display apparatus with a data amount that is determined according to the changed area for displaying the first image.

13 Claims, 7 Drawing Sheets

(51) Int. Cl.
   *G09G 3/00*      (2006.01)
   *H04N 7/01*      (2006.01)
   *H04N 9/31*      (2006.01)
   *G09G 5/00*      (2006.01)
   *G06F 3/14*      (2006.01)
   *G09G 5/14*      (2006.01)

(52) U.S. Cl.
   CPC ..... *G09G 2360/18* (2013.01); *G09G 2370/20* (2013.01); *H04N 7/01* (2013.01)

(56) References Cited

U.S. PATENT DOCUMENTS

| | | |
|---|---|---|
| 2010/0095241 A1 | 4/2010 | Nagano et al. |
| 2014/0115528 A1 | 4/2014 | Nagano et al. |
| 2015/0042561 A1* | 2/2015 | Kubota ................ G06F 3/1415 345/156 |

FOREIGN PATENT DOCUMENTS

| | | |
|---|---|---|
| JP | 2014-49942 A | 3/2014 |
| JP | 2015-60211 A | 3/2015 |

* cited by examiner

DISPLAY SYSTEM, DISPLAY APPARATUS, METHOD OF CONTROLLING DISPLAY APPARATUS, AND PROGRAM

CROSS-REFERENCE

The entire disclosure of Japanese Patent Application No. 2016-169061, filed Aug. 31, 2016 is expressly incorporated by reference herein.

BACKGROUND

1. Technical Field

The present invention relates to a display system, a display apparatus, a method of controlling a display apparatus, and a program.

2. Related Art

In the related art, a system is known in which a plurality of terminal apparatuses are connected to a display apparatus and images that are based on a plurality of pieces of image data, respectively, which are transmitted from the plurality of terminal apparatuses are displayed by the display apparatus. In a case where a plurality of images are displayed by the display apparatus, there are cases when a plurality of images are displayed in different display sizes (for example, refer to JP-A-2013-122550).

A projection apparatus in JP-A-2013-122550 includes a storage unit in which a division pattern table in which division patterns in accordance with the importance of a projection image are registered is stored. In a case where a plurality of projection images are received from a plurality of client terminals, the projection apparatus determines the division pattern based on the importance of the projection image and projects the plurality of projection images in the determined division pattern.

Incidentally, when the number of terminal apparatuses that transmit pieces of image data to the display apparatus increases, a data amount that is received by the display apparatus increases, and there is a likelihood that a delay in display or the like will be caused to occur in the display apparatus. For this reason, it is considered that the data amount that is received by the display apparatus is suppressed from increasing, but for example, a plurality of client apparatuses that are disclosed in JP-A-2013-122550 do not take a countermeasure to deal with particularly an increase in the data amount. Therefore, a technique of efficiently reducing the data amount that is received and processed by the display apparatus is required.

SUMMARY

An advantage of some aspects of the invention is that a data amount that is received by a display apparatus is efficiently reduced in a case where the display apparatus receives data from a terminal apparatus for display.

An aspect of the invention is directed to a display system including: a display apparatus; a first terminal apparatus that transmits first image data to the display apparatus; and a second terminal apparatus that transmits second image data to the display apparatus, in which the display apparatus includes a communication unit that receives the first image data and the second image data, a display unit that displays a first image based on the first image data, and a second image based on the second image data, and a display control unit that changes at least one of an area for displaying the first image and an area for displaying the second image, in which the first terminal apparatus transmits the first image data to the display apparatus with a data amount that is determined according to the changed area for displaying the first image, and in which the second terminal apparatus transmits the second image data to the display apparatus with a data amount that is determined according to the changed area for displaying the second image.

According to the aspect of the invention, in a case where a plurality of images are displayed in the display apparatus, the data amount of the image data that is transmitted to the display apparatus by each of the first and second terminal apparatuses is determined according to an area for an image that is displayed. Therefore, in a case where the image data is transmitted to the display apparatus by each of the plurality of terminal apparatuses, the data amount of the image data that is transmitted to the display apparatus can be suitably distributed to each terminal apparatus. For this reason, the data amount that is received by the display apparatus can be efficiently reduced in a case where the display apparatus receives data from the terminal apparatus for display.

In the display system according to the aspect of the invention, the display control unit may transmit information indicating a post-change area for displaying the first image, to the first terminal apparatus, in a case where an area for displaying the first image is changed, and may transmit information indicating a post-change area for displaying the second image, to the second terminal apparatus, in a case where an area for displaying the second image is changed, the first terminal apparatus may further include a first control unit that controls a data amount of the first image data that is transmitted to the display apparatus, based on the information indicating the area for displaying the first image, which is received from the display apparatus, and the second terminal apparatus may further include a second control unit that controls a data amount of the second image data that is transmitted to the display apparatus, based on the information indicating the area for displaying the second image, which is received from the display apparatus.

According to the aspect of the invention with this configuration, when the area for displaying the image, is changed, the display apparatus transmits the information indicating the post-change area for displaying to each terminal apparatus, and each terminal apparatus controls the data amount of the image data based on the information indicating the area for displaying, which is notified by the display apparatus. Therefore, each terminal apparatus can transmit the image data, with the data amount in accordance with the changed area for displaying.

In the display system according to the aspect of the invention, the display control unit may determine the data amount of the first image data that is transmitted to the display apparatus by the first terminal apparatus, based on the post-change area for displaying the first image, and notifies the first terminal apparatus of the determined data amount, in a case where the area for displaying the first image, is changed, and the display control unit may decide the data amount of the second image data that is transmitted to the display apparatus by the second terminal apparatus, based on the post-change area for displaying the second image, and notifies the second terminal apparatus of the determined data amount, in a case where the area for displaying the second image, is changed.

According to the aspect of the invention with this configuration, when the area for displaying the image, is changed, based on the post-change area for displaying, the display apparatus determines the data amount of the image data that is transmitted to the display apparatus by the terminal apparatus, and notifies the terminal apparatus of the determined data amount of the image data. Therefore, each terminal apparatus can transmit the image data, with the data amount in accordance with the changed area for displaying.

In the display system according to the aspect of the invention, the display control unit may transmit the information indicating the post-change area for displaying the first image, to the first terminal apparatus, whenever the area for displaying the first image, is changed, and the display control unit may transmit the information indicating the post-change area for displaying the second image, to the second terminal apparatus, whenever the area for displaying the second image, is changed.

According to the aspect of the invention with this configuration, whenever the area for displaying the image, is changed, the information indicating the post-change area for displaying the image is transmitted to the terminal apparatus. Therefore, although the area for displaying the image, is changed, the data amount of the image data that is transmitted to the display apparatus by the terminal apparatus can be adjusted with the suitable amount in accordance with the changed area for displaying the image.

In the display system according to the aspect of the invention, the display control unit may determine the data amount of the first image data that is transmitted to the display apparatus by the first terminal apparatus, based on the post-change area for displaying the first image, and may notify the first terminal apparatus of the determined data amount, whenever the area for displaying the first image, is changed, and the display control unit may determine the data amount of the second image data that is transmitted to the display apparatus by the second terminal apparatus, based on the post-change area for displaying the second image, and may notify the second terminal apparatus of the determined data amount, whenever the area for displaying the second image, is changed.

According to the aspect of the invention with this configuration, when the area for displaying the image, is changed, the display apparatus determines the data amount in accordance with the changed area for displaying, and notifies the terminal apparatus of the determined data amount. Therefore, although the area for displaying the image, is changed, the data amount of the image data that is transmitted to the display apparatus by the terminal apparatus can be adjusted to the suitable amount in accordance with the changed area for displaying the image.

In the display system according to the aspect of the invention, the display unit may display the first image and the second image on a display area of a display surface, the display control unit may transmit information indicating an area of the entire display area and the area for displaying the first image, which is displayed on the display area, to the first terminal apparatus, in the case where the area for displaying the first image, is changed, and may transmit information indicating the area of the entire display area and the area for displaying the second image, which is displayed in the display area, to the second terminal apparatus, in the case where the area for displaying the second image, is changed, the first control unit may determine the data amount of the first image data that is transmitted to the display apparatus, using an area ratio of the area for displaying the first image, to the area of the entire display area, based on the information indicating the area of the entire display area and the area for displaying the first image, which is received from the display apparatus, and the second control unit may determine the data amount of the second image data that is transmitted to the display apparatus, using an area ratio of the area for displaying the second image, to the area of the entire display area, which is received from the display apparatus.

According to the aspect of the invention with this configuration, based on the area ratio of the area for displaying the first image or the second image, to the area of the entire display area, the data amount of the image data that is transmitted to the display apparatus by the first or second terminal apparatus is determined. Therefore, the transmission of the image data from the first or second terminal apparatus to the display apparatus can be efficiently performed, and the delay that occurs in the display of the image in the display apparatus can be reduced.

In the display system according to the aspect of the invention, the first control unit may convert a resolution of the first image data or convert a frame rate of the first image data, in such a manner that the data amount of the first image data is the determined data amount, and the second control unit may convert a resolution of the second image data or convert a frame rate of the second image data, in such a manner that the data amount of the second image data is the determined data amount.

According to the aspect of the invention with this configuration, the resolution or the frame rate of the first image data is converted in such a manner that the determined data amount of the first image data is obtained, and the resolution or the frame rate of the second image data is converted in such a manner that the determined data amount of the second image data is obtained. Therefore, the transmission of the image data to the display apparatus can be performed without the delay being caused to occur.

In the display system according to the aspect of the invention, the display unit may display the first image and the second image on a display surface, the display control unit may determine the data amount of the first image data that is transmitted to the display apparatus by the first terminal apparatus, based on the area ratio of the area for displaying the first image to the area of the entire display area, in a case where the area for displaying the first image, is changed, and the display control unit may determine the data amount of the second image data that is transmitted to the display apparatus by the second terminal apparatus, based on the area ratio of the area for displaying the second image to the area of the entire display area, in a case where the area for displaying the second image, is changed.

According to the aspect of the invention with this configuration, based on the area ratio of the area for displaying the first image or the second image, to the area of the entire display area, the data amount of the image data that is transmitted to the display apparatus by the first or second terminal apparatus is determined. Therefore, the transmission of the image data from the first or second terminal apparatus to the display apparatus can be efficiently performed and the delay can be made not to occur in the image that is displayed in the display apparatus. In the display apparatus, the delay time that it takes for the image to be displayed can be reduced.

In the display system according to the aspect of the invention, the first control unit may convert a resolution of the first image data or convert a frame rate of the first image data, in such a manner that the data amount of the first image data is the data amount that is notified by the display apparatus, and the second control unit may convert a resolution of the second image data or convert a frame rate of the second image data, in such a manner that the data amount of the second image data is the data amount that is notified by the display unit.

According to the aspect of the invention with this configuration, the resolution or the frame rate of the first image data is converted in such a manner that the determined data amount of the first image data is obtained, and the resolution or the frame rate of the second image data is converted in such a manner that the determined data amount of the second image data is obtained. Therefore, the transmission of the image data to the display apparatus can be performed without the delay being caused to occur.

Another aspect of the invention is directed to a display apparatus including: a communication unit that performs communication with a first terminal apparatus and a second terminal apparatus; a display unit that causes a first image, which is based on first image data that is received from the first terminal apparatus and a second image, which is based on second image data that is received from the second terminal apparatus, to be displayed; and a display control unit that changes at least one of an area for displaying the first image and an area for displaying the second image, in which the display control unit transmits information indicating the changed area for displaying the first image, to the first terminal apparatus, in a case where an area for displaying the first image is changed, and transmits information indicating the changed area for displaying the second image, to the second terminal apparatus, in a case where an area for displaying the second image is changed.

According to the aspect of the invention, in a case where a plurality of images are displayed in the display apparatus, the data amount of the image data that is transmitted to the display apparatus by each of the first and second terminal apparatuses is determined according to an area for an image that is displayed. Therefore, in a case where pieces of image data that are displayed by the display apparatus are transmitted to the display apparatus by a plurality of terminal apparatuses, the data amount of the image data that is transmitted to the display apparatus can be suitably distributed to each terminal apparatus. For this reason, the data amount that is received by the display apparatus is efficiently reduced in the case where the display apparatus receives data from the terminal apparatus for display.

Another aspect of the invention is directed to a method of controlling a display apparatus, including: performing communication with a first terminal apparatus and a second terminal apparatus; causing a first image, which is based on first image data that is received from the first terminal apparatus and a second image, which is based on second image data that is received from the second terminal apparatus, to be displayed; changing at least one of an area for displaying the first image and an area for displaying the second image, which are displayed; transmitting information indicating the changed area for displaying the first image, to the first terminal apparatus, in a case where an area for displaying the first image is changed; and transmitting information indicating the changed area for displaying the second image, to the second terminal apparatus, in a case where an area for displaying the second image is changed.

According to the aspect of the invention, in a case where a plurality of images are displayed in the display apparatus, the data amount of the image data that is transmitted to the display apparatus by each of the first and second terminal apparatuses is determined according to an area for an image that is displayed. Therefore, in a case where pieces of image data that are displayed by the display apparatus are transmitted to the display apparatus by a plurality of terminal apparatuses, the data amount of the image data that is transmitted to the display apparatus can be suitably distributed to each terminal apparatus. For this reason, the data amount that is received by the display apparatus can be efficiently reduced in a case where the display apparatus receives data from the terminal apparatus for display.

Another aspect of the invention is directed to a program that causes a computer to perform: a procedure for causing a first image, which is based on first image data that is received from the first terminal apparatus and a second image, which is based on second image data that is received from the second terminal apparatus, to be displayed; a procedure for changing at least one of an area for displaying the first image and an area for displaying the second image, which are displayed; a procedure for transmitting information indicating the changed area for displaying the first image, to the first terminal apparatus, in a case where an area for displaying the first image is changed; and a procedure for transmitting information indicating the changed area for displaying the second image, to the second terminal apparatus, in a case where an area for displaying the second image is changed.

According to the aspect of the invention, in a case where a plurality of images are displayed in the display apparatus, the data amount of the image data that is transmitted to the display apparatus by each of the first and second terminal apparatuses is determined according to an area for an image that is displayed. Therefore, in a case where pieces of image data that are displayed by the display apparatus are transmitted to the display apparatus by a plurality of terminal apparatuses, the data amount of the image data that is transmitted to the display apparatus can be suitably distributed to each terminal apparatus. For this reason, the data amount that is received by the display apparatus can be efficiently reduced in a case where the display apparatus receives data from the terminal apparatus for display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are described below referring to the accompanying drawings.

First Embodiment

Figure 1:
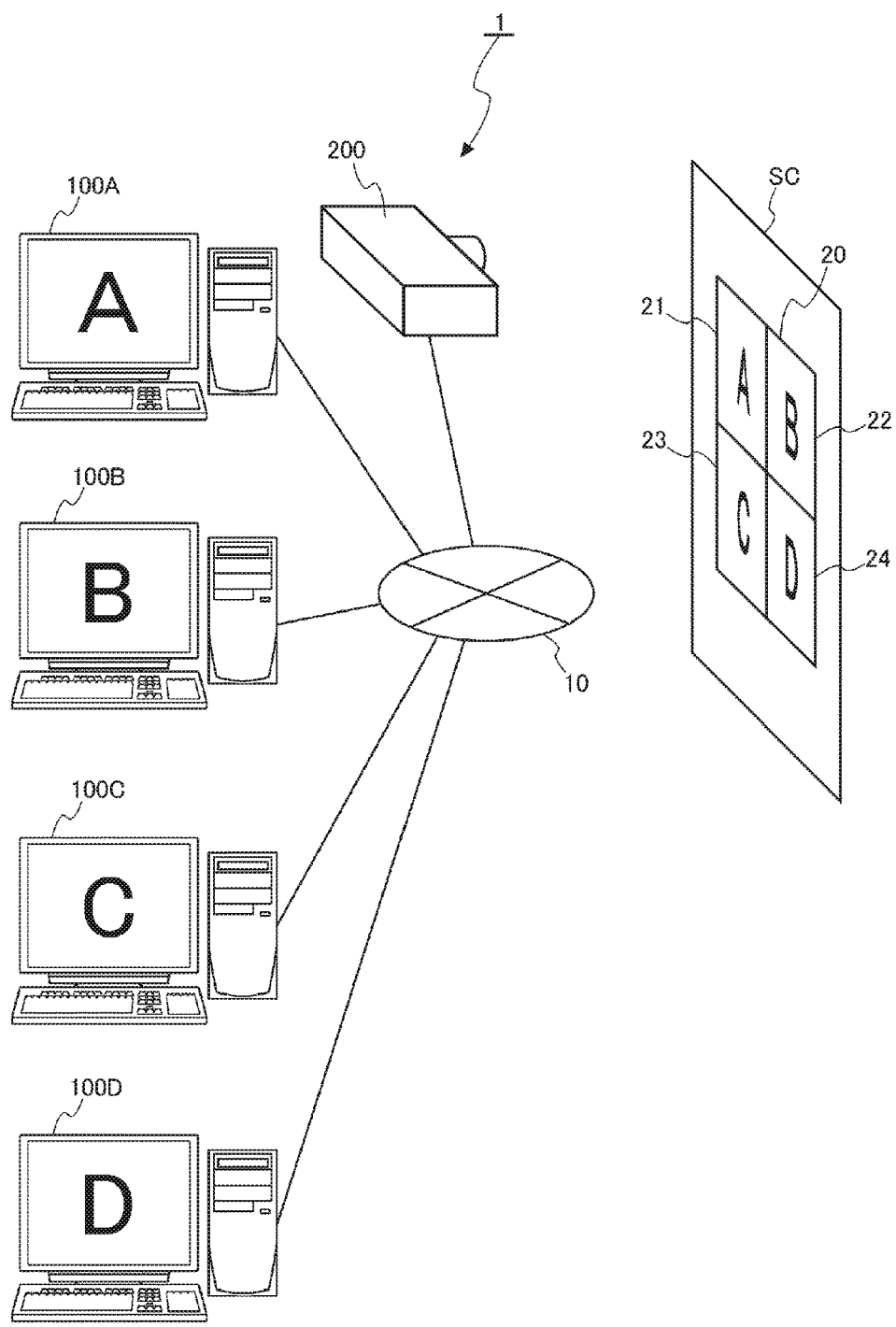
FIG. 1 is a constitutional diagram illustrating a configuration of a display system.

FIG. 1 is a configurational diagram of a configuration of a display system 1 according to a first embodiment.

The display system 1 according to the present embodiment includes a plurality of personal computers (PCs), PCs 100A to 100D, and a projector 200, and has a configuration in which these apparatuses are connected to a network 10. In a case where the PCs 100A to 100D are collectively referred to without distinguishing between them, the PCs 100A to 100D are expressed as a PC 100. The projector 200 is equivalent to a "display apparatus" according to the invention. The PCs 100A to 100D are equivalent to "first terminal apparatuses", "second terminal apparatuses," and "terminal apparatuses" according to the invention.

Each PC 100 is an image supply apparatus that supplies image data (first image data or second image data) to the projector 200, and the projector 200 projects an image that is based on the image data which is supplied from the PC 100, onto a projection target. According to the present embodiment, a case where four PCs 100 are connected, as image supply apparatuses, to the network 10, but the number of PCs 100 that are connected to the network 10 is arbitrary. Furthermore, according to the present embodiment, as an example, a case where the projection target is a screen SC is described, but the projection target onto which the projector 200 projects an image is not limited to the screen SC. The projection target may be a uniformly flat surface, and may be a curved surface, a discontinuous surface, an uneven surface, or the like. Specifically, a surface of a wall of a building or a surface of an object can be set to be the projection target. The screen SC is equivalent to a "display surface" according to the invention.

The network 10, for example, is a network through which bidirectional communication is possible, such as a local area network (LAN) that is configured in compliance with Ethernet (a registered trademark) specifications, and connects the PCs 100A to 100D and the projector 200 to each other in a manner that enables mutual communication. In the present embodiment, a case where the network 10 is configured with a wired communication circuit, such as a LAN, is described, but it is also possible that the network 10 is configured with a wireless communication circuit, such as a wireless LAN.

The projector 200 is equipped with a so-called multi-screen display function in which a display area 20 of the screen SC is divided into a plurality of displays areas and in which images that are input from a plurality of PCs 100, respectively, are displayed in display areas (each of which is hereinafter referred to a division area), respectively, that results from the division. The display area 20 indicates a maximum-sized area on the screen SC, onto which the projector 200 is capable of projecting an image.

FIG. 1 illustrates a state where the display area 20 on the screen SC is divided by 4.

The display area 20 on the screen SC is divided into four division areas, a division area 21, a division area 22, a division area 23, and a division area 24, and images that are based on pieces of image data which are supplied from the PCs 100A to 100D, respectively, are projected onto the division areas 21 to 24, respectively.

FIG. 1 illustrates a case where the display area 20 is divided by 4, but a number by which the display area 20 is divided is arbitrary. That is, it is possible that the display area 20 is divided by 2 or it is also possible that the display area 20 is divided by 6. Furthermore, it is also possible that an image which is supplied from one PC 100 that is selected from among the PCs 100A to 100D is projected onto the entire display area 20, without dividing the display area 20.

Figure 2:
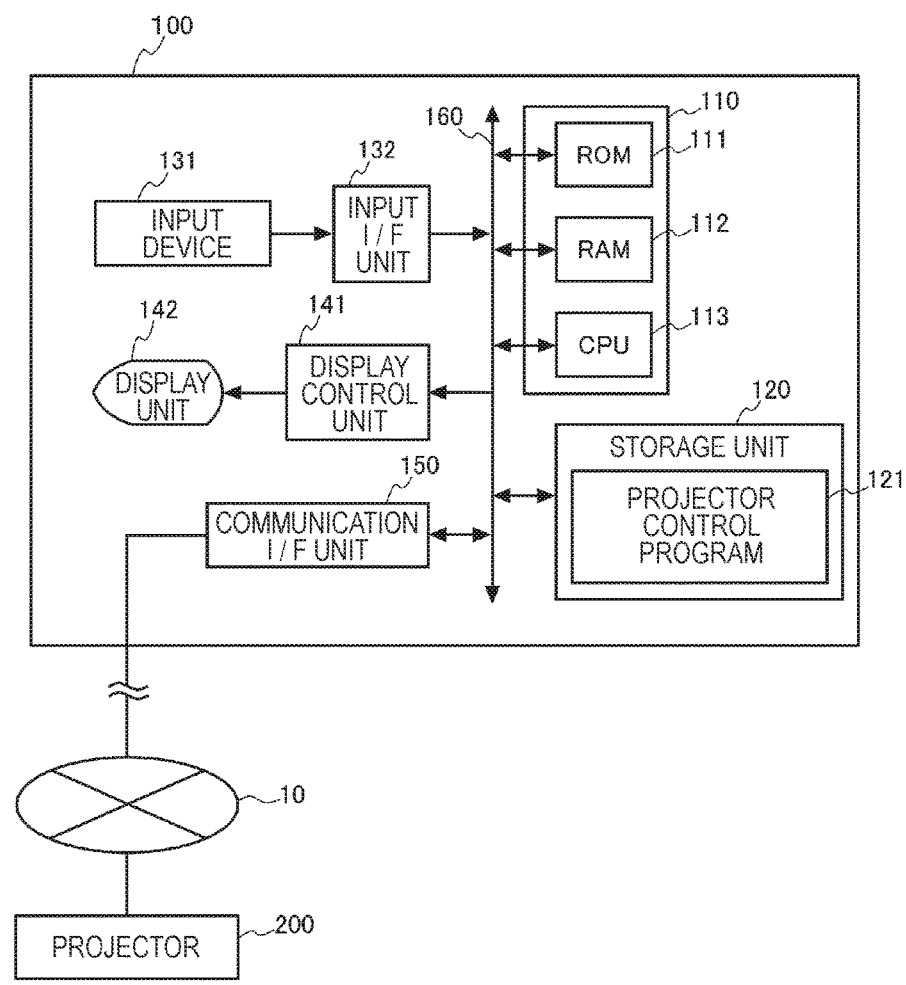
FIG. 2 is a block diagram illustrating a configuration of a PC.

FIG. 2 is a block diagram illustrating a configuration of the PC 100.

The PC 100 includes a control unit 110, a storage unit 120, an input device 131, an input interface unit (an interface is hereinafter described as an I/F for short) 132, a display control unit 141, a display unit 142, and a communication I/F unit 150. The control unit 110, the storage unit 120, the input I/F unit 132, the display control unit 141, and the communication I/F unit 150 each are connected to the internal bus 160. The control unit 110 is equivalent to a "first control unit" or a "second control unit" according to the invention.

The control unit 110 includes a ROM 111, a RAM 112, and a CPU 113.

A basic control program (an operating system (OS)) that is executed by the CPU 113 or data are stored in the ROM 111 in a nonvolatile manner. A program that runs on the OS which is read from the ROM 111, or an application program that is read from the storage unit 120 is loaded onto the RAM 112 by the CPU 113. Furthermore, the RAM 112 is used as a working area for data processing that is performed by the CPU 113. The CPU 113 performs the OS or the application program to perform data processing, and controls each unit of the PC 100.

The application program that is executed by the control unit 110, or the image data is stored in the storage unit 120. In the present embodiment, a projector control program 121 is stored as an application program that is capable of controlling the multi-screen display function of the projector 200.

The input device 131 is a keyboard or a pointing device, such as a mouse or a digitizer. The input I/F unit 132 includes a connector or a power supply circuit, and is connected to the input device 131 by the connector. The input I/F unit 132, for example, is configured with an all-purpose interface for an input device, such as a USB interface, detects an operation by the input device 131 and outputs an operation signal in accordance with the detected operation to the control unit 110.

The display control unit 141 is connected to the display unit 142, such as a monitor or a display, generates a display signal for causing an image to be displayed on the display unit 142, and outputs the generated display signal to the display unit 142.

The communication I/F unit 150 is an interface that connects the PC 100 to the network 10. The PC 100 performs transmission and reception of a frame data that includes the image data or various pieces of control information, through the communication I/F unit 150.

Figure 3:
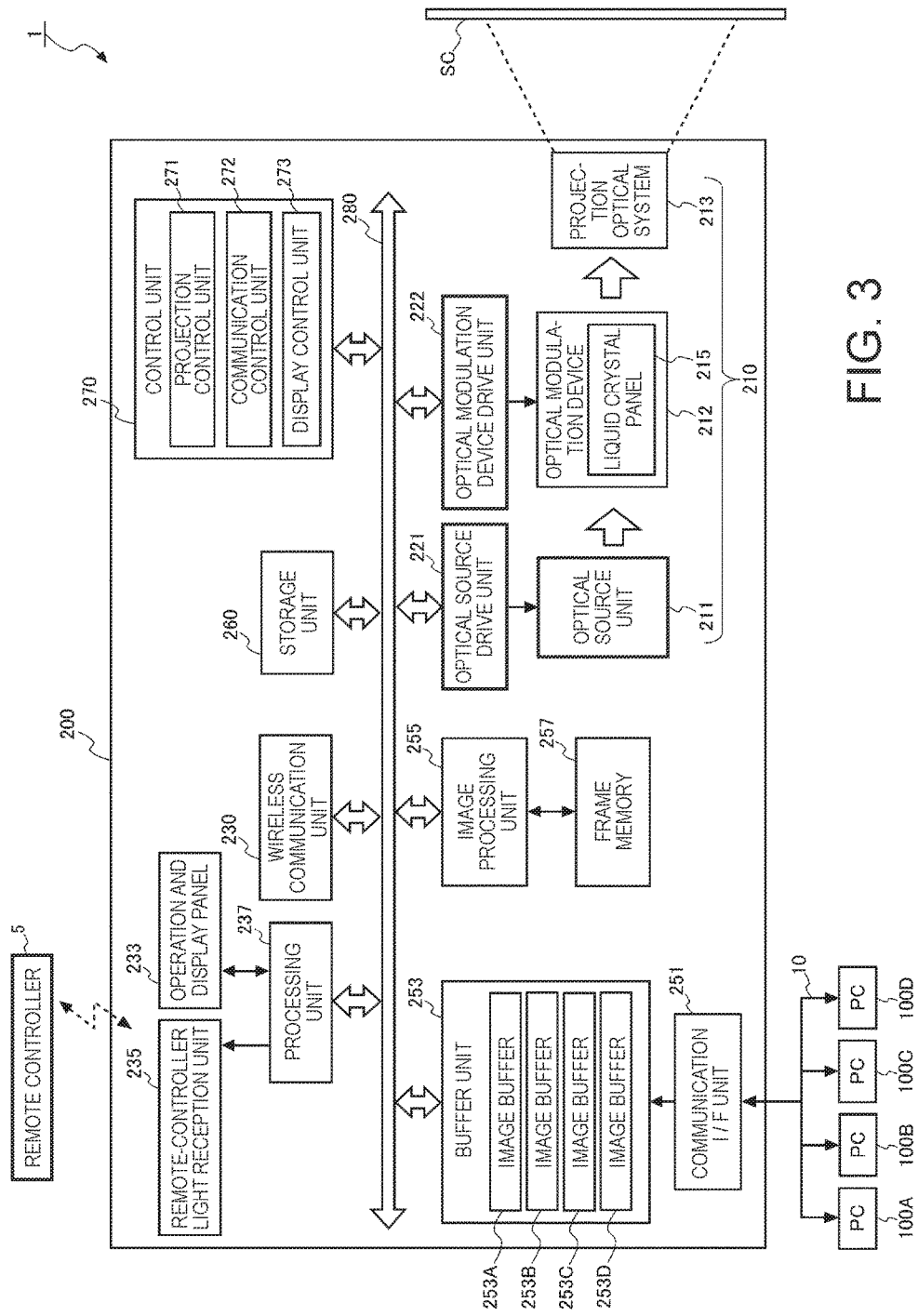
FIG. 3 is a configurational diagram illustrating the configuration of the display system.

FIG. 3 is a block diagram illustrating a configuration of a projector 200.

The projector 200 includes a communication I/F unit 251 that transmits and receives the frame data through the network 10. The communication I/F unit 251 includes a connector or a communication interface circuit that is connected to the network 10, and performs communication with the PC 100 that is connected through the network 10. The communication I/F unit 251 receives the frame data from the PC 100 through the network 10. The communication I/F unit 251 extracts a transmission source address that is information indicating a transmission source of the frame data, from the received frame data, and outputs the extracted transmission source address to a control unit 270 that will be described below. Furthermore, in a case where the image data is included in the frame data, the communication I/F unit 251 extracts the image data from the frame data, and stores the extracted image data in image buffers 253A to 253D of a buffer unit 253 that will be described below, according to the control of the control unit 270. The communication I/F unit 251 is equivalent to a "communication unit" according to the invention.

It is noted that it is also possible that the communication I/F unit 251 is configured as a wireless communication interface, such as a wireless LAN or Bluetooth (a registered trademark).

The buffer unit 253 in which the image data that is extracted from the frame data is temporarily stored is connected to the communication I/F unit 251. Because the image data is stored for each PC 100 that is a transmission source of the image data is stored, the buffer unit 253 has a plurality of image buffers, the image buffers 253A to 253D that are independent storage areas. The image buffers 253A to 253D may result from virtually dividing one storage area.

Furthermore, the number of image buffers 253A to 253D that are provided to the buffer unit 253, is arbitrary, but it is preferable that the image buffers 253A to 253D in accordance with a maximum value of the number by which the display area 20 is divided are provided. In the present embodiment, a case where because the maximum value of the number by which the display area is divided is 4, four image buffers, image buffers 253A to 253D are provided is described.

The projector 200 includes a display unit 210 that performs formation of an optical image and causes the image to be projected onto the screen SC. The display unit 210 is equivalent to a "display unit" according to the invention.

The display unit 210 includes an optical source unit 211, an optical modulation device 212, and a projection optical system 213.

The optical source unit 211 includes an optical source, such as a xenon lamp, an extra-high pressure mercury lamp, a light emitting diode (LED) or a laser optical source. Furthermore, the optical source unit 211 may include a reflector and an auxiliary reflector that lead light which is emitted by the optical source, to the optical modulation device 212. Additionally, the optical source unit 211 may include a lens group that enhances optical properties of projection light, a polarization plate, a modulation element that causes an amount of the light that is emitted by the optical source to be reduced on a path that leads to the optical modulation device 212, and the like, (illustrations of all of which are omitted).

The optical source unit 211 is driven by the optical source drive unit 221. The optical source drive unit 221 is connected to the optical source unit 211 and the internal bus 280. The optical source drive unit 221 causes an optical source of the optical source unit 211 to be powered on and off under the control of the control unit 270.

The optical modulation device 212, for example, includes three liquid crystal panels 215 that correspond to three primary colors, Red, Green, and Blue (RGB). Each liquid crystal panel 215 has a display pixel area (which is equivalent to the display area according to the invention) that is a rectangular area where a plurality of display pixels are arranged in a matrix configuration. An image that is based on the image data is drawn on the display pixel area. The light that is emitted by the optical source unit 211 is separated into three beams of RGB-colored light, which are incident on corresponding liquid crystal panels 215, respectively. The three liquid crystal panels 215 are liquid crystal panels 215 that are of a light transmission type, and modulates light that passes through using the image that is drawn on the display pixel area and generates image light. The beams of image light that are modulated by passing through the liquid crystal panels 215, respectively, are composited by an optical system such as a cross dichroic prism, and light that results from the compositing is emitted to the projection optical system 213.

The optical modulation device 212 is driven by the optical modulation device drive unit 222. The optical modulation device drive unit 222 is connected to the optical modulation device 212 and the internal bus 280. Based on display image data that is input from an image processing unit 255, the optical modulation device drive unit 222 drives the corresponding liquid crystal panel 215 and draws an image on each liquid crystal panel 215.

The projection optical system 213 includes a lens group through which image light that is modulated by the optical modulation device 212 is projected toward the direction of the screen SC and which causes an image to be formed on the screen SC. Furthermore, the projection optical system 213 may include a zoom mechanism that causes a projection image which is projected onto the screen SC to be enlarged and reduced, or a focus adjustment mechanism that performs focus adjustment.

The projector 200 includes a wireless communication unit 230. The wireless communication unit 230 is connected to the internal bus 280. The wireless communication unit 230 includes an antenna, a radio frequency (RF) circuit, or the like, which is not illustrated, and performs wireless communication with an external apparatus under the control of the control unit 270. As a wireless communication scheme for the wireless communication unit 230, for example, a wireless local area network (LAN), Bluetooth, Ultra Wide Band (UWB), a short-distance wireless communication scheme such as infrared communication, or a wireless communication scheme that uses a mobile telephone circuit can be employed.

The projector 200 includes an operation and display panel 233, a remote-controller light reception unit 235, and a processing unit 237. The processing unit 237 is connected to the operation and display panel 233, the remote-controller light reception unit 235, and the internal bus 280.

Various operation keys, or a display panel that uses a liquid crystal display (LCD) are provided to the operation and display panel 233 that functions as a user interface. When the operation key on the operation and display panel 233 is operated, the processing unit 237 outputs an operation signal that corresponds to the key that is operated, to the control unit 270. Furthermore, a touch sensor that detects contact to the operation and display panel 233 is integrally formed on the operation and display panel 233 in a superimposed manner. The processing unit 237 detects a position of the operation and display panel 233 with which a user's finger or the like comes into contact, as an input position, and outputs the operation signal that corresponds to the detected input position, to the control unit 270.

Furthermore, the processing unit 237 causes various screens to be displayed on the operation and display panel 233 based on a control signal that is input from the control unit 270.

The remote-controller light reception unit 235 receives an infrared signal that is transmitted from a remote controller 5. The remote controller 5 includes various buttons and transmits the infrared signal, corresponding to operation of each of these buttons. The processing unit 237 decodes the infrared signal that is carried by the light which is received by the remote-controller light reception unit 235, generates the operation signal indicating details of the operation in the remote controller 5, and outputs the generated operation signal to the control unit 270.

The projector 200 includes an image processing system. This image processing system is configured to primarily include the control unit 270 that controls the entire projector 200 in an integrated manner, and additionally includes the buffer unit 253, the image processing unit 255, a frame memory 257, and a storage unit 260. The control unit 270, the buffer unit 253, the image processing unit 255, and the storage unit 260 that constitute the image processing system are connected to each other through the internal bus 280 in a manner that enables data communication.

The storage unit 260, for example, is an auxiliary storage device such as a hard disk device. The storage unit 260 can be replaced with a flash memory in which it is possible to store a large amount of information, an optical disc, such as a compact disc (CD), a digital versatile disc (DVD), or a Blu-ray (a registered trademark) disc (BD), or the like. An application program that is executed by the control unit 270 or various pieces of data are stored in the storage unit 260.

The control unit 270 includes a CPU, a ROM, and a RAM (illustrations of which are omitted), as pieces of hardware. The ROM is a non-volatile storage device, such as a flash ROM, and a control program or data is stored in the ROM. The RAM constitutes a work area for the CPU. The CPU loads the control program, which is read from the ROM, onto the RAM, and executes the loaded control program and thus controls each unit of the projector 200.

The control unit 270 includes a projection control unit 271, a communication control unit 272, and a display control unit 273, as functional blocks. These functional blocks are blocks indicating a function of the control unit 270 that is realized by the CPU executing a control program.

The projection control unit 271 controls each unit of the projector 200, and thus controls the projection of an image onto the screen SC. For example, the projection control unit 271 controls the optical modulation device drive unit 222, and thus causes an image that is based on the image data, to be drawn on the liquid crystal panel 215 of the optical modulation device 212.

Furthermore, the projection control unit 271 controls the optical source drive unit 221, and controls the powering-on and powering-off of the optical source unit 211. Furthermore, the projection control unit 271 controls the optical source drive unit 221, and adjusts luminance of the optical source unit 211 that is powered on. Furthermore, the projection control unit 271 drives a motor that is not illustrated, causes the zoom mechanism or the focus adjustment mechanism, with which the projection optical system 213 is equipped, to operate, and perform zoom or focus adjustment.

The communication control unit 272 controls the communication I/F unit 251, and thus controls communication with the projector 200 and the PC 100. Furthermore, the communication control unit 272 acquires the transmission source address from the communication I/F unit 251, and based on the acquired transmission source address, specifies a transmission source (the PC 100A to 100D in the present embodiment) of the frame data that is received by the communication I/F unit 251. The communication control unit 272 determines a storage destination (any one of the image buffers 253A to 253D) of the image data based on the specified transmission source, and transmits information indicating the determined storage destination of the image data to the communication I/F unit 251.

The display control unit 273 inputs screen setting information that is transmitted from the PC 100, and based on the screen setting information that is input, generates display information.

The screen setting information is information that results from setting the number by which the display area 20 is divided, or a display position or size of each division area that results from the division, on the display area 20, and is generated by any one of the PCs 100A to 100D that execute the projector control program 121.

Figure 4:
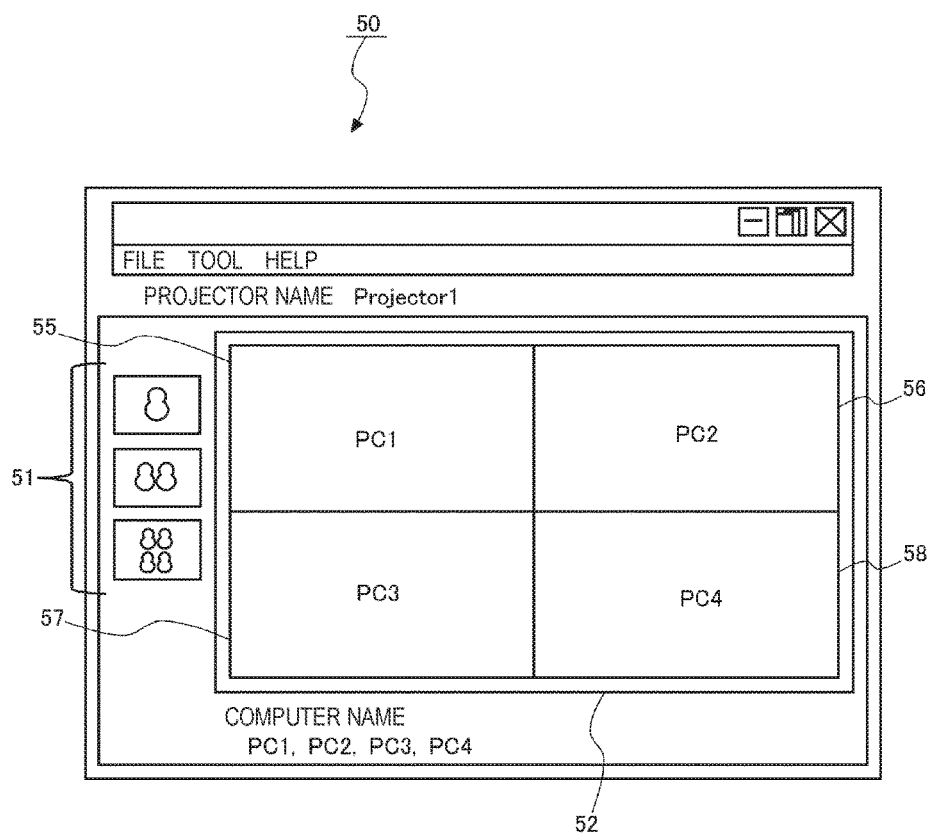
FIG. 4 is a diagram illustrating a division area setting screen.

FIG. 4 is a diagram illustrating a division area setting screen 50 that is displayed on the display unit 142 of the PC 100 that executes the projector control program 121.

A plurality of icons 51 that set the number by which the display area 20 is divided are displayed on the division area setting screen 50. The user selects any one of the icons 51 by operating the input device 131 and thus sets the number by which the display area 20 is divided. When the user selects the icon 51 and selects the number by which the display area 20 is divided, rectangular FIGS. 55 to 58 of which the number is the same as the divisor that is selected are displayed on a setting area 52 of the division area setting screen 50. These FIGS. 55 to 58 are figures that schematically indicate the division areas, respectively, a size in the setting area 52 for the FIGS. 55 to 58 corresponds to a size of each division area, and a display position in the setting area 52 for the FIGS. 55 to 58 corresponds to a display position of each division area.

When the FIGS. 55 to 58 are displayed on the setting area 52, the user changes the sizes and the display positions of the FIGS. 55 to 58 by operating the input device 131. Furthermore, the user performs setting of the division area (hereinafter referred to as a non-display area) on which an image is not displayed, by operating the input device 131.

Furthermore, the user associates the FIGS. 55 to 58 with the PCs 100A to 100D, respectively, by operating the input device 131. That is, it is set which of the FIGS. 55 to 58 that indicate the division areas, respectively, the image that is supplied from each of the PCs 100A to 100D is caused to be displayed on. It is noted that in a case where the figure (the division area) that is set to be in the non-display area is present, the PC 100 is not associated with the figure that is set to be in the non-display area.

When the projector control program 121 is activated, the PC 100 transmits a request for acquisition of a terminal identification name (for example, a computer name) of the PC 100 that is connected to the projector 200, to the projector 200. When acquiring the terminal identification name from the projector 200, the PC 100 causes the acquired terminal identification name to be displayed on the division area setting screen 50. By operating the input device 131, the user performs an operation that associates the FIGS. 55 to 58 which indicate the division areas, respectively, with the terminal identification names, respectively, which are displayed on the division area setting screen 50.

When the operation by the user is completed, the PC 100 transmits the number by which the display area 20 is divided, a size (a size in the vertical and horizontal directions) of the setting area 52, display positions or sizes of the FIGS. 55 to 58 that indicate the division areas, respectively, on the setting area 52, setting in the non-display area, and information that results from associating the FIGS. 55 to 58 that indicate the division areas, respectively, with the PCs 100 (the terminal identification names) respectively, as pieces of screen setting information, to the projector 200.

When the screen setting information is received from the PC 100, the display control unit 273 generates the display information based on the received screen setting information.

The display information is information that is used when the image processing unit 255 loads pieces of image data that are stored in the image buffers 253A to 253D, respectively, onto a storage pixel area of the frame memory 257. The frame memory 257 has a storage pixel area that is a rectangular area in which a plurality of storage pixels are arranged in the matrix configuration.

The display control unit 273 acquires the size of the setting area 52 from the screen setting information, and calculates a magnification rate or a reduction rate (hereinafter referred to as a magnification rate in the vertical direction) for causing the acquired size in the vertical direction of the setting area 52 to be consistent with the size in the vertical direction of the frame memory 257. Furthermore, the display control unit 273 calculates a magnification rate or a reduction rate (hereinafter referred to as a rate in the horizontal direction) for causing the size in the horizontal direction of the setting area 52 to be consistent with the size in the horizontal direction of the frame memory 257.

Next, the display control unit 273 extracts information indicating the display position or the size of each of the FIGS. 55 to 58 that indicate the division area, respectively, from the screen setting information, and magnifies or reduces the extracted information, which indicates the display position or the size of each of the FIGS. 55 to 58, using the magnification rate in the vertical direction and the magnification rate in the horizontal direction, which are calculated. Accordingly, the display position or the size of each of the FIGS. 55 to 58 is converted into information indicating a loading position or a size on the storage pixel area of the frame memory 257 of each division area.

The display control unit 273 outputs the generated information, which indicates the loading position or the size on the storage pixel area of each division area, or the information indicating the loading position or the size of the non-display area, as the display information, to the image processing unit 255.

Next, based on the generated display information, the display control unit 273 calculates an area for displaying, of each division area, on the display pixel area of the liquid crystal panel 215. In the present embodiment, the size (the number of pixels in the vertical direction and the number of pixels in the horizontal direction) of the display pixel area of the liquid crystal panel 215 is set to be the same as the size (the number of pixels in the vertical direction and the number of pixels in the horizontal direction) of the storage pixel area of the frame memory 257. For this reason, the display control unit 273 calculates the area for displaying, each division area on the display pixel area, using the generated display information as it is.

Next, when calculating the area for displaying, of each division area on the display pixel area, the display control unit 273 calculates a ratio (hereinafter referred to as an area ratio) of the calculated area for displaying, of each division area to the area for displaying, of the entire display pixel area. For example, in a case where setting of the division area is setting that divides the display pixel area equally by 4, an area ratio of each division area to the entire display pixel area is 1/4.

Furthermore, in a case where the division area is present that is set to be in the non-display area, the display control unit 273 calculates the area ratio, with an area of the display pixel area, which results from excluding the area for displaying, of the division area that is set to be in the non-display area, as an area of the entire display pixel area. For example, the display pixel area of the liquid crystal panel 215 is equally divided by 4, and any one of the division areas that result from the division by 4 is set to be in the non-display area, an area ratio of the area for displaying, of the division area to the area of the display pixel area is 1/3.

When calculating the area ratio for every division area, with the communication control unit 272, the display control unit 273 transmits information indicating the calculated area ratio to the PC 100. The communication control unit 272 transmits information indicating the area ratio for the division area to the PC 100 that supplies the image data that is caused to be displayed on the division area to the projector 200. Furthermore, the communication control unit 272 may transmit information indicating a maximum data transfer speed to each PC 100, along with the information indicating the area ratio.

The maximum data transfer speed is a data transfer speed in a case where one PC 100 transmits the frame data to the projector 200 that occupies a communication area of the network 10. A data transfer speed is information indicating an amount of data transfer per unit time. A unit of data transfer speed is, for example, megabits per second (Mbps). The data transfer speed is a band in which the PC 100 transfers data to the projector 200 and serves as an index of a data amount that is received from one PC 100 and processed by the projector 200. In the display system 1, a sum of data transfer speeds at which a plurality of PCs 100 transfer data serves as the index of the data amount that is received and processed by the projector 200.

Furthermore, the display control unit 273 may transmit information indicating the area for displaying, of the division area and information indicating the area for displaying, of the entire display pixel area to be displayed on the division areas, to the PC 100 that supplies an image which is caused to be displayed on the division area to the projector 200.

Furthermore, information that the projector 200 transmits to each PC 100 may be only information indicating the area for displaying, of each division area on the display pixel area of the liquid crystal panel 215.

For example, information indicating the area of the display pixel area of the liquid crystal panel 215 and the information indicating the maximum data transfer speed are kept stored in advance in the storage unit 120 of each PC 100. Based on information indicating an area of each division area, which is received from the projector 200, and the information indicating the area of the display pixel area, which is stored in the storage unit 120, the control unit 110 of the PC 100 calculates the data transfer speed. Furthermore, regarding the data transfer speed, the PC 100 may measure the data transfer speed of the network 10 using a ping command or the like.

When receiving the information indicating the area ratio and the information on the maximum data transfer speed from the projector 200, the control unit 110 of the PC 100 calculates the data transfer speed of the frame data that is transmitted to the projector 200.

For example, it is assumed that the display area 20 is equally divided by 4 and that images which are based on pieces of image data which are supplied from the four PCs 100, respectively, are caused to be displayed on the division areas, respectively, that results from the division by 4. Furthermore, for example, it is assumed that the maximum data transfer speed is 10 Mbps. In this case, the control unit 110 of each PC 100 sets 2.5 Mbps that results from multiplying 10 Mbps by "1/4" which is the area ratio, for an upper limit value of the data transfer speed.

Figure 5:
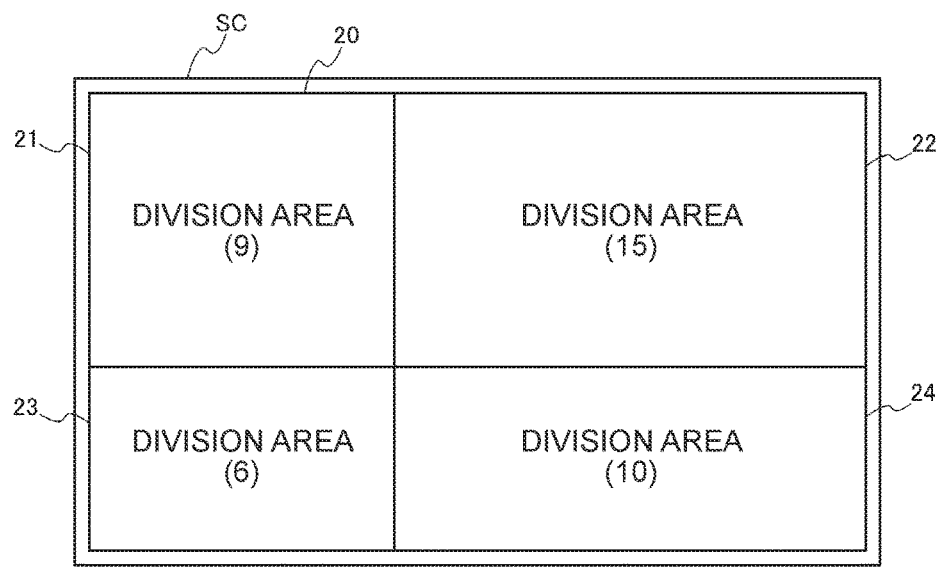
FIG. 5 is a diagram illustrating a state where a display area is divided by 4.

FIG. 5 is a diagram illustrating a state where the display area 20 is divided unequally by 4.

In FIG. 5, as an example, a case is illustrated where an area ratio between four division areas 21, 22, 23, and 24 is 9:15:6:10. Furthermore, the maximum data transfer speed is set to 10 Mbps. In this case, the control unit 110 of each PC 100 sets the upper limit value of the data transfer speed of the image data that is caused to be displayed on each of the division areas 21 to 24, for example, as the following Equations (1) to (4).

$$V_{21MAX}=10\times(9/40)=2.25 \text{ Mbps} \quad (1)$$

$$V_{22MAX}=10\times(15/40)=3.75 \text{ Mbps} \quad (2)$$

$$V_{23MAX}=10\times(6/40)=1.5 \text{ Mbps} \quad (3)$$

$$V_{24MAX}=10\times(10/40)=2.5 \text{ Mbps} \quad (4)$$

In Equations described above, an upper limit of the data transfer speed of the image data that is caused to be displayed on the division area 21 is set to $V_{21MAX}$, and an upper limit of the data transfer speed of the image data that is caused to be displayed on the division area 22 is set to $V_{22MAX}$. Furthermore, an upper limit of the data transfer speed of the image data that is caused to be displayed on the division area 23 is set to $V_{23MAX}$, and an upper limit of the data transfer speed of the image data that is caused to be displayed on the division area 24 is set to $V_{24MAX}$.

Figure 6:
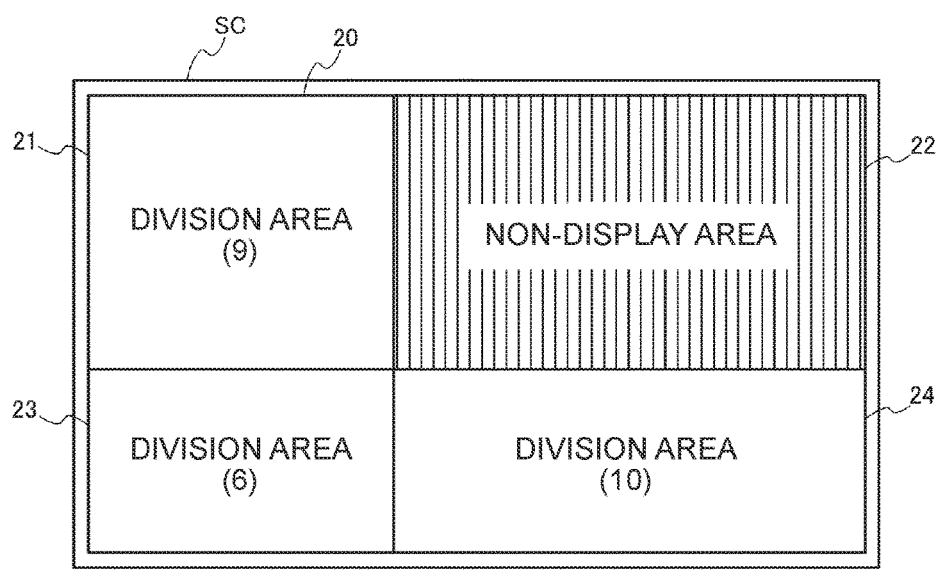
FIG. 6 is a diagram illustrating a state where the display area is divided by 4 and one area that results from the division is set to be a non-display area.

FIG. 6 illustrates a case where the display area 20 is unequally divided by 4 and one of the division areas that result from the division by 4 is set to be a non-display area.

As an example, FIG. 6 illustrates a case where the area ratio between the four division areas 21, 22, 23, and 24 is 9:15:6:10 and the division area 22 is set to be a non-display area. Furthermore, the maximum data transfer speed is set to 10 Mbps. In this case, the control unit 110 of each PC 100 sets the upper limit value of the data transfer speed of the image data that is caused to be displayed on each of the division areas 21, 23, and 24 as the following Equations (5) to (7).

$$V_{21MAX}=10\times(9/25)=3.6 \text{ Mbps} \quad (5)$$

$$V_{23MAX}=10\times(6/25)=2.4 \text{ Mbps} \quad (6)$$

$$V_{24MAX}=10\times(10/25)=4.0 \text{ Mbps} \quad (7)$$

In Equations described above, the upper limit of the data transfer speed of the image data that is caused to be displayed on the division area 21 is set to $V_{21MAX}$, the upper limit of the data transfer speed of the image data that is caused to be displayed on the division area 23 is set to $V_{23MAX}$, and the upper limit of the data transfer speed of the image data that is caused to be displayed on the division area 24 is set to $V_{24MAX}$.

When receiving the information indicating the area ratio from the projector 200 and being instructed to start to transmit the image data, the control unit 110 of the PC 100 generates the frame data in which the image data that is selected by the user is included, and transmits the generated frame data to the projector 200. On this occasion, the control unit 110 controls the communication I/F unit 150 and thus limits the data transfer speed in such a manner that the data transfer speed of the frame data which is transmitted to the projector 200 does not exceed the upper limit value of the data transfer speed that is calculated based on the area ratio.

Furthermore, when calculating the upper limit value of the data transfer speed based on the area ratio, the control unit 110 of the PC 100 may perform resolution conversion processing or frame rate conversion processing on the image data that is transmitted to the projector 200, based on the calculated upper limit value of the data transfer speed. That is, in a case where the calculated upper limit value of the data transfer speed is small, it takes time to transmit the image data, and a delay occurs in the display in the image in the projector 200. For this reason, the control unit 110 of the PC 100, for example, compares the calculated upper limit value of the data transfer speed with a threshold that is set in advance, and in a case where the upper limit value of the data transfer speed is smaller than the threshold, performs the resolution conversion processing and the frame rate conversion processing on the image data. It is noted that one threshold or a plurality of thresholds that have different values may be used for the comparison with the upper limit value of the data transfer speed.

The resolution conversion processing is processing that lowers a resolution of the image data, and the frame rate conversion processing is processing that lowers a frame rate of the image data.

The PC 100 transmits the image data on which the resolution conversion processing or the frame rate conversion processing is performed, to the projector 200. Accordingly, a data amount of the image data that the PC 100 transmits to the projector 200 can be reduced. For this reason, although the data transfer speed is set to be low, the delay is made not to occur in the display of the image in the projector 200.

Furthermore, the projector 200 may notify each PC 100 of the size of the division area on which the image data is displayed, and the control unit 110 of the PC 100 may be made to size-convert the size of the image data into the size that is notified by the projector 200. The control unit 110 of the PC 100 transmits the image data that results from the size conversion to the projector 200.

The image processing unit 255 reads the image data from the image buffers 253A to 253D and loads the image data that is read, onto the storage pixel area of the frame memory 257 according to the display information that is acquired from the display control unit 273. On this occasion, in a case where a size and aspect ratio of the image data that is read are not consistent with a size and an aspect ratio of an area (hereinafter referred to as a partial area"), respectively, of the frame memory 257, onto which the image data that is read is loaded, the image processing unit 255 performs size conversion processing of the image data. The image processing unit 255 performs size change processing, such as change of the aspect ratio, or magnification or reduction of the image data, and thus causes the size and the aspect ratio of the image data to be consistent with the size and the aspect ratio of the partial area of the frame memory 257, onto which the image data is scheduled to be loaded.

When reading pieces of image data from the image buffers 253A to 253D, respectively, and loading the image data for one frame onto the storage pixel area of the frame memory 257, the image processing unit 255 performs image processing, such as color conversion, color irregularity correction, gamma correction, or luminance correction, on the image data that is loaded. The image processing unit 255 reads the image data, on which the image processing is performed, from the frame memory 257, and outputs the image data as image data for display, to the optical modulation device drive unit 222.

Furthermore, whenever the user operates the input device 131 of the PC 100 or the operation and display panel 233 of the projector 200 and performs an operation of changing the area for displaying, of the division area, the display control unit 273 of the projector 200 calculates the post-change area of the division area on the liquid crystal panel 215. Then, the display control unit 273 may calculate an area ratio of the calculated area of the division area to the area of the display pixel area of the liquid crystal panel 215, and may transmit information indicating the calculated area ratio to the PC 100 that supplies the image data that is caused to be displayed on the division area to the projector 200.

Figure 7:
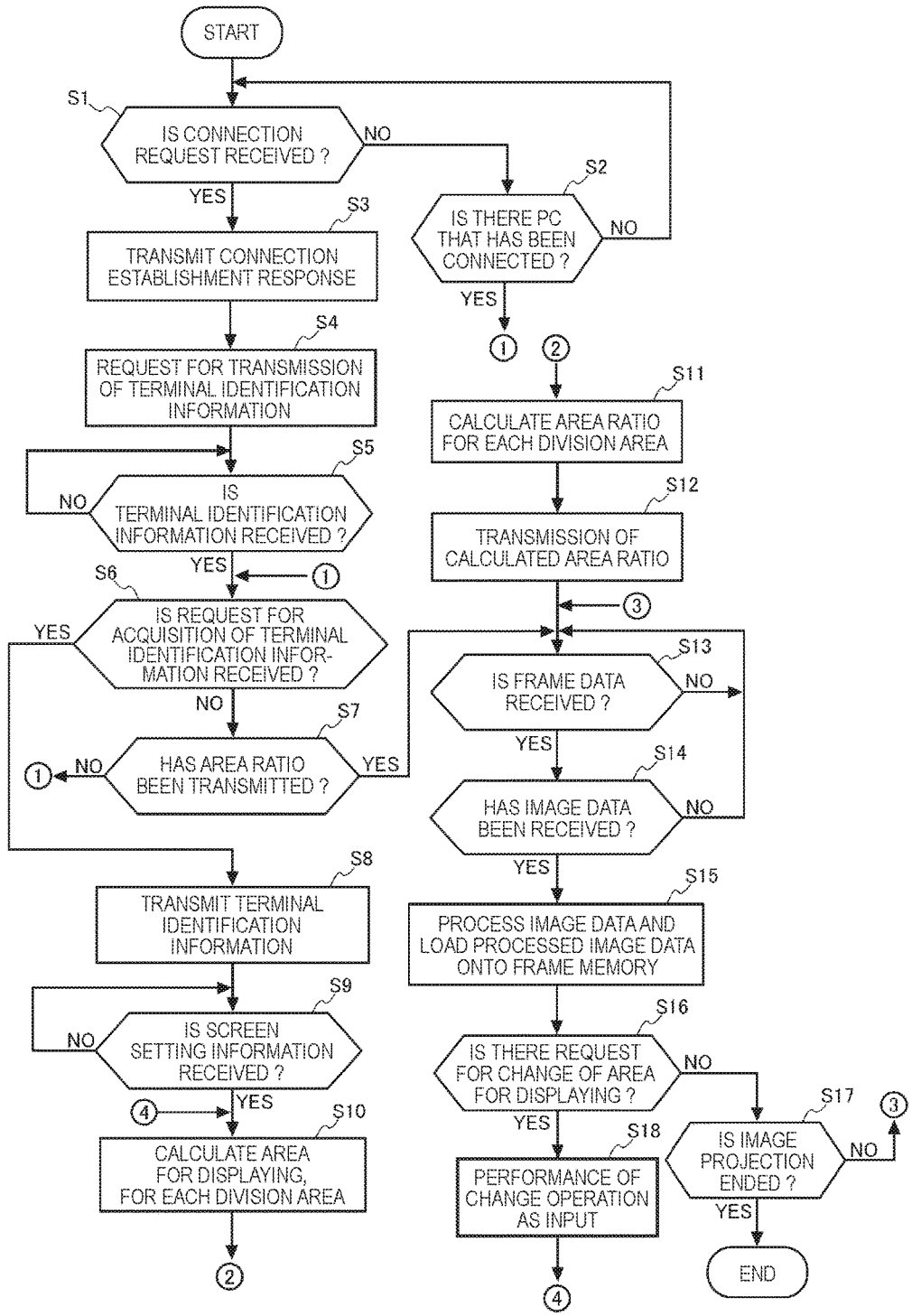
FIG. 7 is a flowchart illustrating operation of a projector.

FIG. 7 is a flowchart illustrating operation of the projector 200.

In Step S1, the control unit 270 of the projector 200 determines whether or not a connection request is received from the PC 100 that is activated by being powered on (Step S1). In a case where the connection request is not received from the PC 100, (NO in Step S1), the control unit 270 determines whether or not the PC 100 that has been connected is present (Step S2). In a case where the PC 100 that has been connected is not present (NO in Step S2), the control unit 270 returns to the determination in Step S1. Furthermore, in a case where the PC 100 that has been connected is present (YES in Step S2), the projector 200 proceeds to determination in Step S6.

Furthermore, in a case where it is determined in the determination in Step S1 that the connection request is received from the PC 100 (YES in Step S1), the control unit 270 of the projector 200 transmits a connection establishment response to the PC 100 that is a transmission source of the connection request (Step S3). Accordingly, a state where a connection between the projector 200 and the PC 100 that is the transmission source of the connection request is established is reached.

Next, the projector 200 requests the PC 100, the connection to which is established, to transmit terminal identification information, such as the computer name (Step S4), and waits until the terminal identification information is received from the PC 100 (Step S5). In a case where the setting of the division area is performed in the PC 100, the terminal identification information is information that is caused to be displayed on the division area setting screen 50. In a case where the terminal identification information is not received from the PC 100 (NO in Step S5), the control unit 270 continues to be in a waiting state until the terminal identification information is received.

Furthermore, when receiving the terminal identification information from the PC 100 (YES in Step S5), the control unit 270 determines whether or not a request for acquisition of the terminal identification information is received from the PC 100 that is connected (Step S6). In a case where the request for the acquisition of the terminal identification information is not received (NO in Step S6), the control unit 270 determines whether or not information indicating an area ratio of each division area to the area of the entire display pixel area of the liquid crystal panel 215 has been transmitted to the PC 100 that is connected (Step S7). In a case where the information indicating the area ratio is not transmitted to the PC 100 that is connected (NO in Step S7), the control unit 270 returns to the determination in Step S6. Furthermore, in a case where the information indicating the area ratio has been transmitted to the PC 100 that is connected (YES in Step S7), the control unit 270 proceeds determination in Step S13.

Furthermore, in a case where in Step S6, the request for the acquisition of the terminal identification information (YES in Step S6) is received, the control unit 270 transmits the terminal identification information of the PC 100 that has been connected, for the request for the acquisition (Step S8). Next, the control unit 270 determines whether or not the screen setting information is received from the PC 100 that transmits the terminal identification information (Step S9). In a case where the screen setting information is not received (NO in Step S9), the control unit 270 waits until the screen setting information is received.

Furthermore, when receiving the screen setting information (YES in Step S9), the control unit 270 generates the display information based on the received screen setting information. Based on the received screen setting information, the control unit 270 generates information indication the size or the display position of each division area on the frame memory 257, as the display information. When generating the display information, the control unit 270 calculates the area for displaying, of each division area on the display pixel area using the generated display information (Step S10). When calculating the area for displaying, of each division area, the control unit 270 calculates a ratio of the area for displaying, of the division area to the area of the entire display pixel area of the liquid crystal panel 215 for every division area (Step S11). Then, the control unit 270 transmits the calculated area ratio for each division area to the PC 100 that transmits the image data which is displayed on each division area to the projector 200 (Step S12).

Thereafter, the projector 200 waits until the frame data is received from the PC 100 (Step S13). In a case where the frame data is not received (NO in Step S13), the projector 200 waits until the frame data is received (Step S13). When the frame data is received from the PC 100 (YES in Step S13), the projector 200 extracts the transmission source address indicating the transmission source of the frame data and the image data from the received frame data in the communication I/F unit 251. The communication I/F unit 251 outputs the extracted transmission source address to the control unit 270.

Based on the transmission source address that is input from the communication I/F unit 251, the control unit 270 generates information designating the image buffers 253A to 253D in which the received image data is stored. The control unit 270 outputs the generated information designating the image buffers 253A to 253D to the communication I/F unit 251. According to the information that is input, the communication I/F unit 251 stores the image data that is extracted from the frame data, to any of the image buffers 253A to 253D.

Next, the control unit 270 receives the image data from all the PCs 100 that are set as the transmission sources of the image data, and determines whether or not the received image data is stored in the corresponding image buffers 253A to 253D (Step S14).

In a case where the image data is not received from all the PCs 100 that are set as the transmission sources (NO in Step S14), the control unit 270 returns to the determination in Step S13. Furthermore, in a case where the image data is received from all the PCs 100 that are set as the transmission sources (YES in Step S14), the control unit 270 causes image processing to be performed on the image processing unit 255. The image processing unit 255 reads the image data from each buffer unit 253, performs processing, such as conversion processing, on the image data that is read, and loads the post-conversion image data onto the frame memory 257 (Step S15). When the image data for one frame is loaded onto the frame memory 257, the image processing unit 255 outputs the loaded image data, as the display image data, to the optical modulation device drive unit 222. According to the control of the projection control unit 271, the optical modulation device drive unit 222 draws an image that is based on the image data, on the liquid crystal panel 215 of the optical modulation device 212.

Then, light that is emitted from the optical source unit 211 is modulated into image light by the liquid crystal panel 215 of the optical modulation device 212, and the image light that results from the modulation is projected onto the screen SC by the projection optical system 213.

For example, it is assumed that as the PCs 100 that supply pieces of image data, respectively, as illustrated in FIG. 1, four PCs, the PCs 100A to 100D are prepared, that the display area 20 of the screen SC is divided by 4, and that images that are based on the pieces of image data which are supplied from the PCs 100A to 100D, respectively, are caused to be displayed on the division areas 21 to 24, respectively, that result from the division. In this case, the images that are based on the pieces of image data which are supplied from the PCs 100A to 100D, respectively, are caused to be displayed on the division areas 21 to 24, respectively.

Next, the control unit 270 determines whether or not a request for changing of the area for displaying, of the division area is received (Step S16). In a case where the request for the change of the area for displaying is not received (NO in Step S16), the control unit 270 determines whether or not an operation of ending projection of an image onto the screen SC is performed as input (Step S17). In a case where the operation of ending the projection of the image is not performed as input (NO in Step S17), the control unit 270 proceeds to determination in Step S13. Furthermore, in a case where the operation of ending the projection of the image is performed as input (YES in Step S17), the control unit 270 causes this processing flow to be ended.

Furthermore, in a case where in the determination in Step S16, a request for the change of the area for the division area is received (YES in Step S16), the control unit 270 performs processing that changes the area of the division area. The changing of the area of the division area may be performed in any one of the PCs 100A to 100D, and can also be performed in the projector 200.

For example, in the PC 100, in a case where the area of the division area is changed, the division area setting screen 50 that is illustrated in FIG. 4 is caused to be displayed again on the display unit 142 of the PC 100, and an operation by the user is performed, as input, with the input device 131. According to the operation that is performed as input with the input device 131, the control unit 110 changes the display positions or the sizes of the FIGS. 55 to 58, which indicate the division areas, respectively. Then, when the operation by the user is ended, based on the display positions or the sizes of the FIGS. 55 to 58 that indicate the changed division area, respectively, the control unit 110 generates information indicating the display position or the size of each division area, and transmits the generated information, as the screen setting information, to the projector 200.

Furthermore, in the projector 200, in a case where the area of the division area is changed, the control unit 270 causes a figure that corresponds to each pre-change division area to be displayed on the operation and display panel 233. The number of figures that are displayed on the operation and display panel 233 is the same as the number of pre-change division areas, and the display position and the size of each figure on the operation and display panel 233 correspond to the display position and the size of each division area on the display area 20.

The user operates the operation and display panel 233, and thus selects a figure of which an area for displaying is desired to be changed and changes a display position or a size of the selected figure. When the operation of the operation and display panel 233 is performed as input (Step S18), according to the operation that is performed as input, the control unit 270 changes the display position or the size of the figure indicating the division area. Then, when the operation by the user is ended, based on the display position or the size of the figure indicating the changed division area, the control unit 110 again calculates the area for displaying, of each division area that results after the area for displaying is changed (Step S10).

Figure 8:
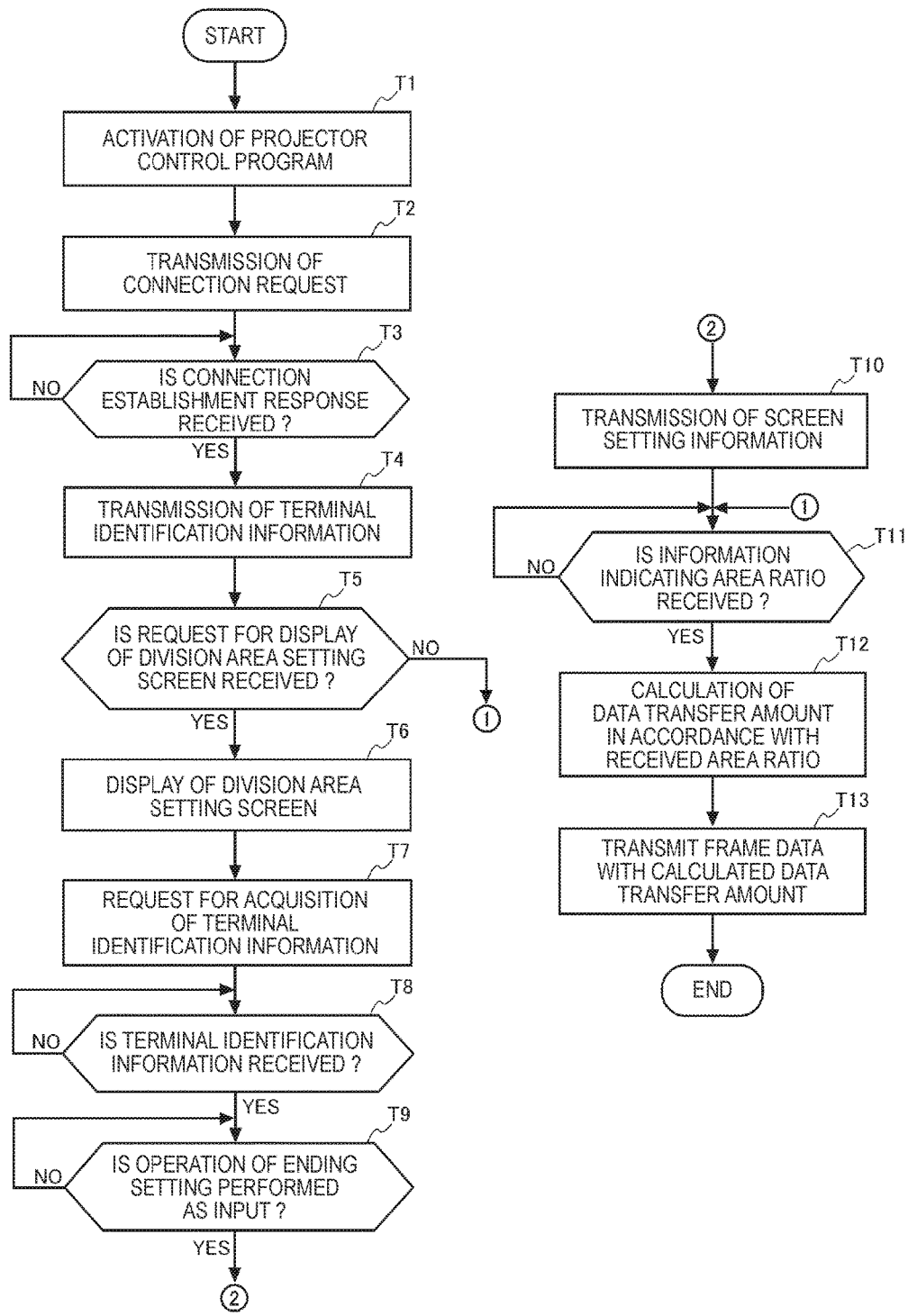
FIG. 8 is a flowchart illustrating operation of the PC.

FIG. 8 is a flowchart illustrating operation of the PC 100.

When the PC 100 is powered on and the projector control program 121 is activated with the operation of the input device 131 by the user (Step T1), the control unit 110 of the PC 100 transmits the connection request to the projector 200 (Step T2). Then, the control unit 270 is in a state of waiting to receive the connection establishment response that is transmitted from the projector 200 (Step T3). In a case where the connection establishment response is not received from the projector 200 (NO in Step T3), the control unit 270 continues to be in a state of waiting to receive the connection establishment response.

Furthermore, when the connection establishment response is received from the projector 200 (YES in Step T3), according to a request for transmission of the terminal identification information, which is received successively from the projector 200, the control unit 110 transmits the terminal identification information that is the computer name which is set for the PC 100, to the projector 200 (Step T4).

When the terminal identification information is transmitted to the projector 200, the control unit 110 determines whether or not a request for displaying of the division area setting screen 50 is received by the input device 131 (Step T5). In a case where the request for the displaying of the division area setting screen 50 is not received (NO in Step T5), in Step T11, the control unit 110 determines whether or not the information indicating the area ratio is received from the projector 200 (Step T11). The determination in Step T11 will be described below.

Furthermore, in a case where the request for the displaying of the division area setting screen 50 is received (YES in Step T5), the control unit 110 causes the division area setting screen 50 to be displayed on the display unit 142 (Step T6), and transmits the request for the acquisition of the terminal identification information of the PC 100 that has been connected to the projector 200 (Step T7). Then, the control unit 110 waits until the terminal identification information is received from the projector 200 (Step T8).

In a case where the terminal identification information is not received from the projector 200 (NO in Step T8), the control unit 110 continues to be in the waiting state. Furthermore, when the terminal identification information is received from the projector 200 (YES in Step T8), the control unit 110 causes the terminal identification information of the PC 100 that has been connected to the projector 200 to be displayed on the division area setting screen 50. Then, according to the operation that is performed, as input, with the input device 131, the control unit 110 changes the displaying of the division area setting screen 50. For example, the control unit 110 changes the number or sizes of figures that indicate the division areas, respectively, which are caused to be displayed on the setting area 52 of the division area setting screen 50, or the display positions of the division areas. Furthermore, in a case where the setting in the non-display area is performed, as input, with the input device 131, the control unit 110 generates information indicating the division area that is set to be in the non-display area, and causes to the generated information to be stored in the RAM 112.

Furthermore, the PC 100 determines whether or not an operation of ending the setting is performed, as input, with the input device 131 (Step T9). In a case where the operation is not performed as input (NO in Step T9), according to the operation that is performed, as input, with the input device 131, the control unit 110 changes the displaying of the division area setting screen 50. Furthermore, in a case where the operation of ending the setting is performed, as input, with the input device 131 (YES in Step T9), the control unit 110 transmits the division number of division areas that are set, the size (the size in the vertical and horizontal directions) of the setting area 52, the display positions or the sizes of the figures that indicate the division areas, respectively, on the setting area 52, the setting in the non-display area, and the information that results from associating the figures that indicate the division areas, respectively, with the PCs 100 (the terminal identification names), respectively, as pieces of screen setting information, to the projector 200 (Step T10).

Next, the control unit 110 determines whether or not the information indicating the area ratio is received from the projector 200 (Step T11). In a case where the information indicating the area ratio is not received (NO in Step T11), the control unit 110 waits until the information indicating the area ratio is received from the projector 200 (Step T11).

Furthermore, when the information indicating the area ratio is received from the projector 200 (YES in Step T11), based on the received information indicating the area ratio, the control unit 110 calculates the upper limit value of the data transfer speed of the frame data that is transmitted to the projector 200 (Step T12). When the upper limit value of the data transfer speed is calculated, the control unit 110 generates the frame data that is included in the image data which is selected by the user, and starts to transmit the frame data to the projector 200 (Step T13). At this time, the control unit 110 controls the communication I/F unit 150 in such a manner that the data transfer speed does not exceed the upper limit value of the calculated data transfer speed in the transmission of the frame data to the projector 200.

As described above, the embodiment to which the display system, the display apparatus, the method of controlling the display apparatus, and the program according to the invention are applied includes the projector 200, and a plurality of PCs, the PCs 100A to 100D that transmit pieces of image data to the projector 200. The projector 200 includes the communication I/F unit 251, the display unit 210, and the display control unit 273.

The display unit 210 displays images that are based on a plurality of pieces of image data that are received by the communication I/F unit 251 from a plurality of PCs, the PCs 100A to 100D, respectively, on the division areas 21 to 24 of the display area 20, respectively.

The display control unit 273 changes any one of the division areas 21 to 24.

When the area of any one of the division areas 21 to 24 is changed, the PCs 100A to 100D that cause images to be displayed on the changed division areas 21 to 24, respectively, transmit pieces of image data to the projector 200, with the data amounts that are determined according to the areas of the changed division areas 21 to 24, respectively. Therefore, the data amount of the image data that is transmitted to the projector 200 can be suitably distributed to each PC 100. For this reason, in a case where the projector 200 receives data from the PC 100 for display, the data amount that is received by the projector 200 can be effectively reduced.

Furthermore, in a case where the area of any one of the division areas 21 to 24 on each of which an image is displayed is changed, the display control unit 273 transmits information indicating post-change areas for displaying, of the division areas 21 to 24 to the corresponding PCs 100A to 100D, respectively.

Based on the information indicating the post-change areas for displaying, of the division areas 21 to 24, which is received from the projector 200, the control unit 110 of each of the PCs 100A to 100D controls the data amount of the image data that is transmitted to the projector 200.

Therefore, the PCs 100A to 100D can transmit pieces of image data, respectively, with suitable amounts in accordance with the changed areas for displaying, of the division areas 21 to 24, respectively.

Furthermore, whenever the area of any one of the division areas 21 to 24 is changed, the display control unit transmits information indicating the post-change areas of the division areas 21 to 24 to the corresponding PCs 100A to 100D.

Therefore, the data amount of the image data that is transmitted to the projector 200 by each of the PCs 100A to 100D is changed to the data amount in accordance with an area for displaying an image.

Therefore, although the areas of the division areas 21 to 24 are changed, the data amounts of the pieces of image data that are transmitted to the projector 200 by the PCs 100A to 100D, respectively, can be adjusted suitably according to the changed areas of the division areas 21 to 24.

Furthermore, in a case where the area of any one of the division areas 21 to 24 is changed, the display control unit 273 notifies the corresponding one of the PCs 100A to 100D of the information indicating the area of the entire display pixel area of the liquid crystal panel 215, and an area for the image data that is displayed on the display pixel area.

Based on the information that is notified by the projector 200, each of the PCs 100A to 100D decides the data amount of the image data that is transmitted to the projector 200, using the area ratio of the area for the image data that is displayed on the display pixel area to the area of the entire display pixel area.

Therefore, the PCs 100A to 100D can transmit the pieces of image data, with the suitable data amounts in accordance with the changed areas of the division areas 21 to 24.

Furthermore, the control unit 110 of each of the PC 100A to the PC 100D converts the resolution of the image data or converts a frame rate of the image data, in such a manner that the data amount of the image data that is transmitted to the projector 200 is the data amount that is determined. Therefore, the transmission of the image data to the projector 200 can be performed without any delay.

Second Embodiment

A second embodiment of the invention is described. Because configurations of the PC 100 and the projector 200 according to the second embodiment are the same as the configurations of the PC 100 and the projector 200 according to the first embodiment, which are illustrated in FIGS. 2 and 3, respectively, the explanation thereof is omitted.

In the first embodiment describe above, in the projector 200, the area ratio of the area for displaying, of each of the division areas 21 to 24 to the area of the entire display pixel area is calculated, and the calculated area ratio is transmitted to each PC 100, and in each PC 100, the upper limit value of the data transfer speed is calculated based on the area ratio.

In the present embodiment, the upper limit value of the data transfer speed is calculated based on the area ratio that is calculated by the projector 200, for each of the division areas 21 to 24, and information indicating the calculated upper limit value of the data transfer speed is notified to the PC 100 that supplies the image data which is displayed in each of the division areas 21 to 24.

In more detail, whenever an operation of changing the areas for displaying, of the division areas 21 to 24 is performed, the display control unit 273 of the projector 200 calculates the areas for displaying, of the post-change division areas 21 to 24 on the liquid crystal panel 215. Then, the display control unit 273 calculates an area ratio of each of the calculated areas for displaying, of the division areas 21 to 24 to the area of the display pixel area of the liquid crystal panel 215. When calculating the area ratio of each of the areas for displaying, of the division areas 21 to 24 to the area of the entire display pixel area, the display control unit 273 of the projector 200 calculates the upper limit value of the data transfer speed based on the calculated area ratio, for every division area. A method of calculating the upper limit value of the data transfer speed is the same as the method of the calculation by the control unit 110 of the PC 100 in the first embodiment.

When the upper limit value of the data transfer speed is calculated for every division area, the display control unit 273 transmits the calculated upper limit value of the data transfer speed to the PC 100 that supplies the image data that is caused to be displayed on each division area, to the projector 200.

Furthermore, the display control unit 273 may change the calculated upper limit value of the data transfer speed.

For example, the display control unit 273 may change the upper limit value of the data transfer speed for the division area that has the largest area for displaying to a value of a higher speed, and may change the upper limit value of the data transfer speed for the division area that has the smallest area for displaying to a value of a lower speed. That is, although a delay occurs in an image that is displayed on the division area that has a small area for displaying, a delay is made not to occur in an image that is displayed on the division area that has a larger area for displaying.

It is noted that a sum of the upper limit values of the data transfer speeds for the division areas is made to be consistent with the maximum data transfer speed.

When receiving the information indicating the upper limit value of the data transfer speed from the projector 200 and being instructed to start to transmit the image data, the control unit 110 of the PC 100 generates the frame data including the image data that is selected by the user and transmits the generated frame data to the projector 200. On this occasion, the control unit 110 controls the communication I/F unit 150 and thus limits a communication speed in such a manner that the data transfer speed of the frame data that is transmitted to the projector 200 does not exceed the upper limit value of the data transfer speed that is notified by the projector 200.

For example, based on the upper limit value of the received data transfer speed, the control unit 110 of the PC 100 performs the resolution conversion processing or the frame rate conversion processing on the image data that is transmitted to the projector 200, converts the post-conversion image data into the frame data, and transmits the resulting frame data to the projector 200.

In the present embodiment, the same effect as in the first embodiment described above can be obtained as well. Furthermore, because the upper limit value of the data transfer speed of each PC 100 is set, the projector 200 can easily perform adjustment of the data transfer speed of each PC 100, without exceeding the maximum data transfer speed.

Furthermore, when the area of any one of the division areas 21 to 24 is changed, based on the changed areas for displaying, of the division areas 21 to 24, the display control unit 273 determines the data amount of the image data. Then, the display control unit 273 notifies the PCs 100, which supply the pieces of image data which are caused to be displayed on the division areas 21 to 24, respectively, of which the areas for displaying are changed, of the determined data amount of the image data. Therefore, the PC 100 can transmit the image data, with the data amount in accordance with the changed area.

Furthermore, when the area of any one of the division areas 21 to 24 is changed, the display control unit 273 determines the data amount of the image data based on the changed areas of the division areas 21 to 24. Therefore, whenever the area is changed, the PC 100 can transmit the image data, with the data amount in accordance with the changed area.

Furthermore, in a case where the area of any one of the division areas 21 to 24 is changed, based on the area ratio of the area for the image data that is displayed on the display pixel area to the area of the entire display pixel area of the liquid crystal panel 215, the display control unit 273 determines the data amount of the image data. The display control unit 273 transmits the determined data amount of the image data to the PCs 100 that supply the pieces of images that are displayed on the division areas 21 to 24, respectively, of which the areas for displaying are changed. Therefore, the transmission of the image data from the PC 100 to the projector 200 can be efficiently performed, and a delay can be made not to occur in the image that is displayed on the projector 200. Furthermore, in the projector 200, the delay time that it takes for an image to be displayed can be reduced.

The first and second embodiments are suitable embodiments of the invention. However, no limitation to this is imposed, and various modifications to the embodiments are possible within the scope that does not depart from the gist of the invention.

For example, in the embodiments described above, the configuration in which, as the optical modulation device 212 that modulates light which is emitted by the optical source, the three liquid crystal panels that are of a light transmission type, which correspond to red, green and blue (RGB), respectively, are used, is taken as an example for description, but the invention is not limited to this. For example, a configuration in which three liquid crystal panels that are of a light reflection type are used may be employed, and a technique that results from combing one liquid crystal panel and a color wheel may be used. Alternatively, a configuration may be employed in which a technique that uses three digital mirror devices (DMD), a DMD technique that results from combining one digital mirror device and a color wheel, or the like is used. In a case where as the optical modulation device, only one liquid crystal panel or the DMD is used, a member that is equivalent to the optical system for compositing, such as a cross dichroic prism, is unnecessary. Furthermore, in addition to the liquid crystal panel and the DMD, any optical modulation device that is capable of modulating light that is emitted by the optical source can be employed without any problem.

Furthermore, each functional unit of the PC 100 that is illustrated in FIG. 2, and each functional unit of projector 200 that is illustrated in FIG. 3 illustrate a functional configuration, and no limitation to a specific form of mounting is particularly imposed. More precisely, a hardware item that individually corresponds to each functional unit does not necessarily need to be mounted, and of course, it is also possible that a configuration is employed in which the performing of one program by one processor realizes functions of a plurality of functional units. Furthermore, in the embodiments described above, one or several of the functions that are realized in software may be realized in hardware. Alternatively, one or several of the functions that are realized in hardware may be realized in software. In addition, an arbitrary change to another specific detailed configuration of each unit of the projector 200 is also possible within a range that does not depart from the gist of the invention.

Furthermore, units of processing in the flowchart that is illustrated in FIG. 7 result from division according to details of the processing for an easy understanding of the processing by the display control unit 273 of the projector 200, and the invention is not limited by a method of division into the units of processing or the names of the units of processing. In the same manner, units of processing in the flowchart that is illustrated in FIG. 8 result from division according to details of the processing for an easy understanding of the processing by the control unit 110 of the PC 100, and the invention is not limited by a method of division into the units for processing or the names of the units for processing.

Furthermore, the processing by each of the display control unit 273 and the control unit 110 can also be further divided into many units of processing according to the details of the processing, and one unit of processing can also be further divided to include many processing operations. Furthermore, the order of the processing operations in the flowchart described above is also not limited to the example that is illustrated.

What is claimed is:

1. A display system comprising:
 a display apparatus;
 a first terminal apparatus that transmits first image data to the display apparatus; and
 a second terminal apparatus that transmits second image data to the display apparatus,
 wherein the display apparatus includes
   a communication interface that receives the first image data and the second image data,
   a display that displays a first image based on the first image data, and a second image based on the second image data, and
   a display controller that changes at least one of a first display area for displaying the first image and a second display area for displaying the second image,
 wherein:
   the first terminal apparatus transmits the first image data to the display apparatus with a data amount that is determined according to the changed first display area for displaying the first image,
   the second terminal apparatus transmits the second image data to the display apparatus with a data amount that is determined according to the changed second display area for displaying the second image, and
   the display controller transmits a first calculated upper limit value of a data transfer speed to the first terminal apparatus and a second calculated upper limit value of the data transfer speed to the second terminal apparatus.

2. The display system according to claim 1, wherein:
 the display controller transmits information indicating a first post-change area for displaying the first image, to the first terminal apparatus, in a case where the first display area is changed, and transmits information indicating a second post-change area for displaying the second image, to the second terminal apparatus, in a case where the second display area is changed,
 the first terminal apparatus further includes a first controller that controls a data amount of the first image data that is transmitted to the display apparatus, based on the information indicating the first display area, which is received from the display apparatus, and
 the second terminal apparatus further includes a second controller that controls a data amount of the second image data that is transmitted to the display apparatus, based on the information indicating the second display area, which is received from the display apparatus.

3. The display system according to claim 2, wherein:
 the display controller determines the data amount of the first image data that is transmitted to the display apparatus by the first terminal apparatus, based on the first post-change area for displaying the first image, and notifies the first terminal apparatus of the determined data amount, in a case where the first display area is changed, and
 the display controller determines the data amount of the second image data that is transmitted to the display apparatus by the second terminal apparatus, based on the second post-change area for displaying the second image, and notifies the second terminal apparatus of the determined data amount, in a case where the second display area is changed.

4. The display system according to claim 2, wherein:
 the display controller transmits the information indicating the first post-change area for displaying the first image to the first terminal apparatus, whenever the first display area is changed, and
 the display controller transmits the information indicating the second post-change area for displaying the second image to the second terminal apparatus, whenever the second display area is changed.

5. The display system according to claim 3, wherein:
 the display controller determines the data amount of the first image data that is transmitted to the display apparatus by the first terminal apparatus, based on the first post-change area for displaying the first image, and notifies the first terminal apparatus of the determined data amount, whenever the first display area is changed, and
 the display controller determines the data amount of the second image data that is transmitted to the display apparatus by the second terminal apparatus, based on the second post-change area for displaying the second image, and notifies the second terminal apparatus of the determined data amount, whenever the second display area is changed.

6. The display system according to claim 2,
wherein:
the display displays the first image on the first display area included in an entire display area and the second image on the second display area included in the entire display area,
the display controller transmits information indicating the entire display area and the first display area to the first terminal apparatus, in the case where the first display area is changed, and transmits information indicating the entire display area and the second display area to the second terminal apparatus, in the case where the second display area is changed,
the first controller determines the data amount of the first image data that is transmitted to the display apparatus, using an area ratio of the area for displaying the first image to the entire display area, based on the information indicating the entire display area and the first display area, which is received from the display apparatus, and
the second controller determines the data amount of the second image data that is transmitted to the display apparatus, using an area ratio of the second display area to the entire display area, which is received from the display apparatus.

7. The display system according to claim 6,
wherein:
the first controller converts a resolution of the first image data or converts a frame rate of the first image data, in such a manner that the data amount of the first image data is the determined data amount, and
the second controller converts a resolution of the second image data or converts a frame rate of the second image data, in such a manner that the data amount of the second image data is the determined data amount.

8. The display system according to claim 3,
wherein:
the display displays the first image on the first display area included in an entire display area and the second image the second display area included in the entire display area,
the display controller determines the data amount of the first image data that is transmitted to the display apparatus by the first terminal apparatus, based on an area ratio of the first display area to the entire display area, in a case where the first display area is changed, and
the display controller determines the data amount of the second image data that is transmitted to the display apparatus by the second terminal apparatus, based on an area ratio of the second display area to the entire display area, in a case where the second display area is changed.

9. The display system according to claim 8,
wherein:
the first controller converts a resolution of the first image data or converts a frame rate of the first image data, in such a manner that the data amount of the first image data is the data amount that is notified by the display apparatus, and
the second controller converts a resolution of the second image data or converts a frame rate of the second image data, in such a manner that the data amount of the second image data is the data amount that is notified by the display apparatus.

10. A display apparatus comprising:
a communication interface that performs communication with a first terminal apparatus and a second terminal apparatus;
a display that causes a first image, which is based on first image data that is received from the first terminal apparatus and a second image, which is based on second image data that is received from the second terminal apparatus, to be displayed; and
a display controller that changes at least one display area of a first display area for displaying the first image and a second display area for displaying the second image,
wherein:
the display controller transmits information indicating the changed first display area for displaying the first image to the first terminal apparatus, in a case where the first display area is changed, and transmits information indicating the changed second display area to the second terminal apparatus, in a case where the second display area is changed, and
the display controller transmits a first calculated upper limit value of a data transfer speed to the first terminal apparatus and a second calculated upper limit value of the data transfer speed to the second terminal apparatus.

11. A method of controlling a display apparatus, comprising:
performing communication with a first terminal apparatus and a second terminal apparatus;
causing a first image, which is based on first image data that is received from the first terminal apparatus and a second image, which is based on second image data that is received from the second terminal apparatus, to be displayed;
changing at least one display area of a first display area for displaying the first image and a second display area for displaying the second image;
transmitting information indicating the changed first display area for displaying the first image to the first terminal apparatus, in a case where the first display area is changed;
transmitting information indicating the changed second display area to the second terminal apparatus, in a case where the second display area is changed; and
transmitting a first calculated upper limit value of a data transfer speed to the first terminal apparatus and a second calculated upper limit value of the data transfer speed to the second terminal apparatus.

12. A non-transitory computer-readable medium that comprises a memory and a processor, the processor being configured to execute the following steps:
displaying a first image, which is based on first image data that is received from a first terminal apparatus and a second image, which is based on second image data that is received from a second terminal apparatus;
changing at least one display area of a first display area for displaying the first image and a second display area for displaying the second image;
transmitting information indicating the changed first display area to the first terminal apparatus, when the first display area is changed;
transmitting information indicating the changed second display area to the second terminal apparatus, when the second display area is changed; and
transmitting a first calculated upper limit value of a data transfer speed to the first terminal apparatus and a second calculated upper limit value of the data transfer speed to the second terminal apparatus.

13. The display system according to claim 1,
wherein the display controller changes the first calculated upper limit value of the data transfer speed to the first terminal apparatus and the second calculated upper limit value of the data transfer speed to the second terminal apparatus, based on a characteristic of a division area.

* * * * *